US010573147B1

(12) United States Patent
Mousavi et al.

(10) Patent No.: US 10,573,147 B1
(45) Date of Patent: Feb. 25, 2020

(54) TECHNOLOGIES FOR MANAGING SAFETY AT INDUSTRIAL SITES

(71) Applicant: ABB Schweiz AG, Baden (CH)

(72) Inventors: Mirrasoul J. Mousavi, Cary, NC (US); Mithun P. Acharya, Cary, NC (US); Brian D. Barr, Cordova, TN (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/120,863

(22) Filed: Sep. 4, 2018

(51) Int. Cl.
*G08B 21/02* (2006.01)
*G08B 27/00* (2006.01)
*H04L 29/06* (2006.01)

(52) U.S. Cl.
CPC ............ *G08B 21/02* (2013.01); *G08B 27/00* (2013.01); *H04L 63/1425* (2013.01)

(58) Field of Classification Search
CPC .... G08B 21/02; G08B 21/18; G08B 21/0453; G08B 27/00; G08B 25/08; G06Q 50/06; G06Q 30/0601; H04L 63/0861; H04L 63/1425; H04L 43/0847; H04L 43/0823; G05B 23/0229
See application file for complete search history.

(56) References Cited

U.S. PATENT DOCUMENTS

| | | | | |
|---|---|---|---|---|
| 8,786,425 B1* | 7/2014 | Hutz | ...................... | H04M 11/04 340/526 |
| 9,613,523 B2* | 4/2017 | Davidson | ............... | G06Q 50/16 |
| 9,904,587 B1* | 2/2018 | Potlapally | ............. | G06F 11/079 |
| 9,998,804 B2* | 6/2018 | Awiszus | .................... | A62B 9/00 |
| 10,298,604 B2* | 5/2019 | Epstein | ............... | H04L 63/0861 |
| 10,360,779 B2* | 7/2019 | Correnti | ............... | G08B 15/002 |
| 2003/0005107 A1* | 1/2003 | Dulberg | ..................... | G06F 9/54 709/223 |
| 2003/0135349 A1* | 7/2003 | Yoshie | ............... | G05B 23/0229 702/183 |

(Continued)

OTHER PUBLICATIONS

CaptionBot—The Magic, https://www.captionbot.ai/Home/Magic, printed Sep. 23, 2019, 4 pages.

(Continued)

*Primary Examiner* — Hoi C Lau
(74) *Attorney, Agent, or Firm* — Barnes & Thornburg LLP

(57) ABSTRACT

Technologies for managing safety at an industrial site include a method. The method includes receiving, by a compute device in a cloud data center, condition data indicative of a sensed or determined condition at the industrial site. The condition data was produced at least in part by an edge device at the industrial site. The method also includes analyzing, by the compute device and with a model that associates conditions with corresponding safety statuses, the received condition data to determine a corresponding safety status associated with the industrial site. Further, the method includes determining, by the compute device and as a function of the determined safety status, whether a responsive action is to be performed at the industrial site. Additionally, the method includes sending, by the compute device, to the edge device at the industrial site and in response to a determination that a responsive action is to be performed at the industrial site, responsive data indicative of the responsive action to be performed.

20 Claims, 6 Drawing Sheets

(56) References Cited

U.S. PATENT DOCUMENTS

| | | | | |
|---|---|---|---|---|
| 2005/0131573 | A1* | 6/2005 | You | G05B 19/4065 |
| | | | | 700/175 |
| 2005/0256601 | A1* | 11/2005 | Lee | G05B 19/4184 |
| | | | | 700/108 |
| 2006/0161394 | A1* | 7/2006 | Dulberg | G06F 11/0748 |
| | | | | 702/184 |
| 2007/0234781 | A1* | 10/2007 | Yamada | F23N 3/002 |
| | | | | 73/23.2 |
| 2008/0306621 | A1* | 12/2008 | Choi | G05B 19/41875 |
| | | | | 700/110 |
| 2010/0016745 | A1* | 1/2010 | Crump | A61B 5/02055 |
| | | | | 600/519 |
| 2011/0218957 | A1* | 9/2011 | Coon | G06Q 30/0601 |
| | | | | 706/54 |
| 2012/0019378 | A1* | 1/2012 | Watson | H04L 12/2825 |
| | | | | 340/539.1 |
| 2013/0027561 | A1* | 1/2013 | Lee | G06Q 30/02 |
| | | | | 348/150 |
| 2013/0030875 | A1* | 1/2013 | Lee | G06Q 10/06311 |
| | | | | 705/7.38 |
| 2013/0262216 | A1* | 10/2013 | Zhang | G06Q 30/02 |
| | | | | 705/14.36 |
| 2013/0278414 | A1* | 10/2013 | Sprigg | G08B 21/0453 |
| | | | | 340/539.12 |
| 2014/0035750 | A1* | 2/2014 | Korakin | G08B 21/18 |
| | | | | 340/585 |
| 2014/0163759 | A1* | 6/2014 | Anderson | G06Q 50/06 |
| | | | | 700/291 |
| 2014/0214345 | A1* | 7/2014 | Ordanis | G01R 19/2513 |
| | | | | 702/62 |
| 2014/0232539 | A1* | 8/2014 | Hiruta | G07C 5/08 |
| | | | | 340/438 |
| 2014/0358592 | A1* | 12/2014 | Wedig | G06Q 40/08 |
| | | | | 705/4 |
| 2015/0046361 | A1* | 2/2015 | Williams | G06Q 10/083 |
| | | | | 705/330 |
| 2015/0244598 | A1* | 8/2015 | Puhlmann | H04L 43/0847 |
| | | | | 709/224 |
| 2015/0355245 | A1* | 12/2015 | Ordanis | G01R 21/133 |
| | | | | 702/62 |
| 2016/0061687 | A1* | 3/2016 | Srivastava | G01M 5/0033 |
| | | | | 73/786 |
| 2016/0063182 | A1* | 3/2016 | Srivastava | G06F 19/32 |
| | | | | 705/2 |
| 2016/0063387 | A1* | 3/2016 | Srivastava | G06N 5/048 |
| | | | | 706/52 |
| 2016/0092787 | A1* | 3/2016 | Gadde | G06N 5/02 |
| | | | | 706/12 |
| 2018/0025618 | A1* | 1/2018 | Rutter | G08B 25/006 |
| | | | | 340/517 |
| 2018/0069879 | A1* | 3/2018 | Epstein | H04L 63/0861 |
| 2018/0089042 | A1* | 3/2018 | Demetriou | G06Q 10/0631 |
| 2018/0350219 | A1* | 12/2018 | Correnti | G08B 25/08 |
| 2019/0050752 | A1* | 2/2019 | Kang | G06N 20/00 |
| 2019/0098035 | A1* | 3/2019 | Periaswamy | H04L 63/1425 |
| 2019/0166025 | A1* | 5/2019 | Trivedi | H04L 43/0823 |

OTHER PUBLICATIONS

Honeywell, Leak Film, https://www.partnerconnect.honeywell.com/en/Prd_bkup/Gas-Detection/HI-Tech/Leak-Film.aspx, printed Sep. 23, 2019, 2 pages.

RLE Technologies, "Leak Detection Sensing Cable & Spot Detectors—How Are They Different?" https://rletech.com/blog/leak-detection-sensing-cable-spot-detectors-how-are-they-different/, printed Sep. 23, 2019 6 pages.

3M, "Water Contact Indicator Tape 5557," Dec. 2004, 5 pages.

* cited by examiner

TECHNOLOGIES FOR MANAGING SAFETY AT INDUSTRIAL SITES

BACKGROUND

In typical industrial plants and food processing facilities, safety practices such as human hazard reporting and safety observation tours (SOTs) address safety hazards as they are identified and dealt with. However, despite these efforts, accidents, near misses, and contamination issues still occur. Often, safety issues are addressed with quick fixes that result in corrosion of metal, overstressing of electrical systems, and other conditions that eventually lead to equipment malfunctions and new safety hazards. Further, while some facilities may include sensors to identify specific, isolated safety concerns, such as ingress of liquid past a predefined boundary or electrical overloads, complex and slowly developing safety issues at an industrial site may go unnoticed.

SUMMARY OF THE INVENTION

In one aspect, the present disclosure provides a method for managing safety at an industrial site. The method includes receiving, by a compute device in a cloud data center, condition data indicative of a sensed or determined condition at an industrial site. The condition data was produced at least in part by an edge device at the industrial site. The method also includes analyzing, by the compute device and with a model that associates conditions with corresponding safety statuses, the received condition data to determine a corresponding safety status associated with the industrial site. Further, the method includes determining, by the compute device and as a function of the determined safety status, whether a responsive action is to be performed at the industrial site. Additionally, the method includes sending, by the compute device, to the edge device at the industrial site and in response to a determination that a responsive action is to be performed at the industrial site, responsive data indicative of the responsive action to be performed.

In another aspect, the present disclosure provides a compute device for a cloud data center. The compute device includes a compute engine configured to receive condition data indicative of a sensed or determined condition at an industrial site. The condition data was produced at least in part by an edge device at the industrial site. The compute engine is further to analyze, with a model that associates conditions with corresponding safety statuses, the received condition data to determine a corresponding safety status associated with the industrial site. Additionally, the compute engine is to determine, as a function of the determined safety status, whether a responsive action is to be performed at the industrial site, and send, to the edge device at the industrial site and in response to a determination that a responsive action is to be performed at the industrial site, responsive data indicative of the responsive action to be performed.

In yet another aspect, the present disclosure provides one or more machine-readable storage media including a plurality of instructions stored thereon that, in response to being executed, cause a compute device to receive condition data indicative of a sensed or determined condition at an industrial site. The condition data was produced at least in part by an edge device at the industrial site. The instructions also cause the compute device to analyze, with a model that associates conditions with corresponding safety statuses, the received condition data to determine a corresponding safety status associated with the industrial site, determine, as a function of the determined safety status, whether a responsive action is to be performed at the industrial site, and send, to the edge device at the industrial site and in response to a determination that a responsive action is to be performed at the industrial site, responsive data indicative of the responsive action to be performed.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
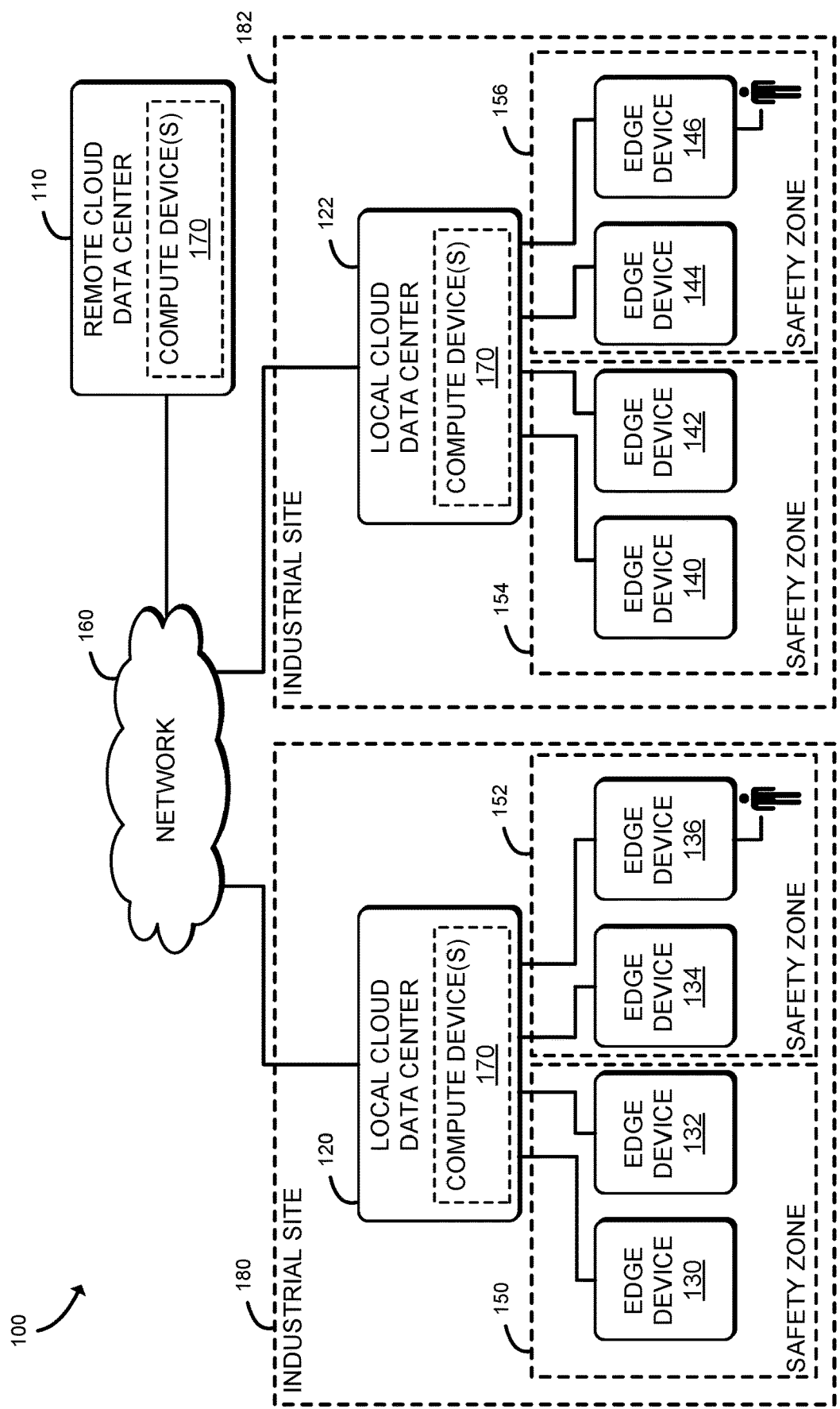
FIG. 1 is a simplified block diagram of at least one embodiment of a system for managing safety at multiple industrial sites.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for managing safety at multiple industrial sites includes cloud data centers 110, 120, 122, each of which includes a set of compute devices 170 capable of executing workloads (e.g., applications) to analyze data received from edge devices 130, 132, 134, 136, 140, 142, 144, 146 located at industrial sites 180, 182. In operation, the edge devices 130, 132, 134, 136, 140, 142, 144, 146 which may be embodied as relatively-resource constrained devices (e.g., having less compute and memory capacity than the compute devices 170), may report, to a corresponding local (e.g., on premise or within a predefined range that is closer to the industrial site 180, 182 than the cloud data center 110) data indicative of conditions at the corresponding industrial sites 180, 182. The data may be produced by one or more sensors (e.g., visual sensors, audio sensors, thermal sensors, etc.) in each edge device 130, 132, 134, 136, 140, 142, 144, 146 or entered by a human operator (e.g., as a result of an inspection at the industrial site 180, 182). The compute devices 170 in the corresponding local cloud data center 120, 122 aggregate the received data and apply a model (e.g., a neural network or other artificial intelligence-based model to determine whether a safety hazard exists or is developing). In doing so, the compute devices 170 of a cloud data center 120, 122 may receive feedback from a human operator (e.g., an expert) and/or from a higher level cloud data center (e.g., the cloud data center 110, which may utilize a model that has been trained on a larger data set) to identify the presence or development of a safety hazard. The compute devices 170 may issue responsive data to the edge devices to take a remedial action, such as broadcasting a warning to avoid a particular safety zone 150, 152, 154, 156 that is affected by a safety hazard, deactivating one or more systems in an affected safety zone, or taking other actions, as described herein. Over time, by sharing data and by receiving feedback from human experts, the cloud data centers 110, 120, 122 refine their models to more accurately identify safety hazards and provide improved safety management over conventional safety management systems.

Figure 2:
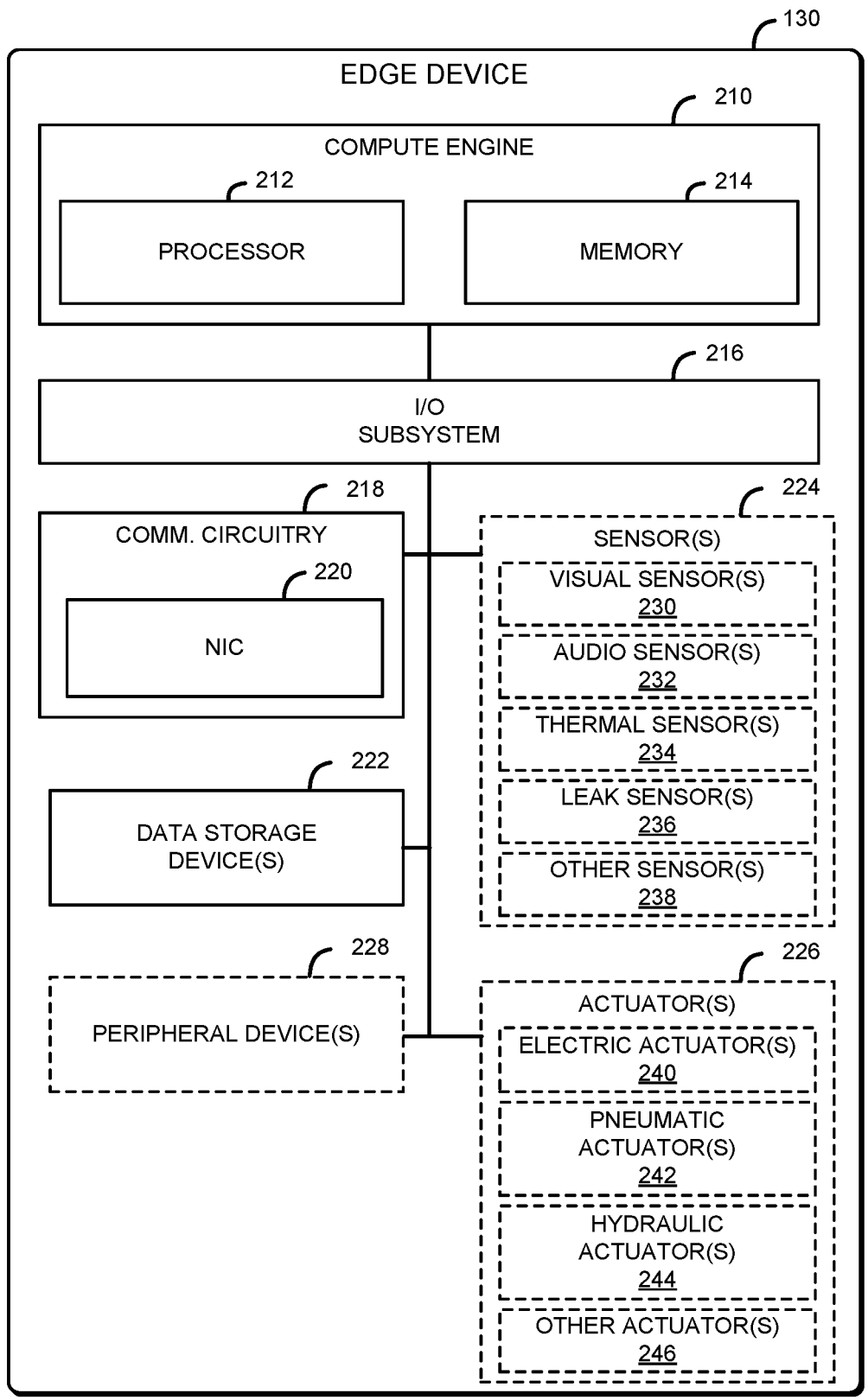
FIG. 2 is a simplified block diagram of at least one embodiment of an edge device of the system of FIG. 1.

Referring now to FIG. 2, the edge device 130 may be embodied as any type of device (e.g., a computer) capable of performing the functions described herein, including sensing one or more conditions in an industrial site 180, reporting the condition to a local cloud data center 120, receiving responsive data indicative of an action to be performed to mitigate an identified safety hazard, and performing the action. As shown in FIG. 2, the illustrative edge device 130 includes a compute engine 210, an input/output (I/O) subsystem 216, communication circuitry 218, and one or more data storage devices 222. The edge device 130 may also contain one or more sensors 224 and/or one or more actuators 226. Of course, in other embodiments, the edge device 130 may include other or additional components, such as those commonly found in a computer, such as peripheral devices 228. Additionally, in some embodiments, one or more of the illustrative components may be incorporated in, or otherwise form a portion of, another component.

The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. Additionally, in some embodiments, the compute engine 210 includes or is embodied as a processor 212 and a memory 214. The processor 212 may be embodied as any type of processor capable of performing the functions described herein. For example, the processor 212 may be embodied as a single or multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. In some embodiments, all or a portion of the main memory 214 may be integrated into the processor 212. In operation, the main memory 214 may store various software and data used during operation, such as sensor data, instructions for performing remedial actions to mitigate safety hazards, applications, programs, libraries, and drivers.

The compute engine 210 is communicatively coupled to other components of the edge device 130 via the I/O subsystem 216, which may be embodied as circuitry and/or components to facilitate input/output operations with the compute engine 210 (e.g., with the processor 212 and/or the main memory 214) and other components of the edge device 130. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the edge device 130, into the compute engine 210.

The communication circuitry 218 may be embodied as any communication circuit, device, or collection thereof, capable of enabling communications between the edge device 130 and another device (e.g., the compute devices 170, other edge devices 132, 134, 136, 140, 142, 144, 146, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220. The NIC 220 may be embodied as one or more add-in-boards, daughter cards, network interface cards, controller chips, chipsets, or other devices that may be used by the edge device 130 to connect with another device. In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the edge device 130 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include an operating system partition that stores data files and executables for an operating system.

As discussed above, the edge device 130 may include one or more sensors 224, each of which may be embodied as any device or circuitry configured to collect data indicative of conditions in an environment in which the sensor 224 is located. The edge device 130 may include a visual sensor 230, which may be embodied as any device or circuitry (e.g., a camera) configured to obtain visual information (e.g., an image, a video, etc.) about the surrounding environment, such as chafing of nearby wires, corrosion of pipes, and/or other conditions. Similarly, the edge device 130 may include an audio sensor 232 which may be embodied as any device or circuitry (e.g., a microphone) configured to obtain audio information (e.g., dripping sounds, squeaks, rattling, etc. of equipment) from the surrounding environment. Additionally or alternatively, the edge device 130 may include a thermal sensor 236, which may be embodied as any device or circuitry (e.g., a thermometer) configured to obtain thermal information from the surrounding environment. The edge device 130 may additionally or alternatively include a leak sensor, which may be embodied as any device or circuitry (e.g., a device containing a ribbon with holes through which a liquid may pass, and a conductive solution that experiences a change in electrical resistivity as a result of the introduction of the liquid through the holes, etc.) capable of detecting the ingress of liquid or gas into an area. Additionally or alternatively, the edge device 130 may include other sensors that include devices and/or circuitry capable of detecting the presence of one or more other conditions in the environment.

Further, and as mentioned above, the edge device 130 may include one or more actuators 226, each of which may be embodied as any mechanical or electromechanical device capable of physically controlling a mechanism or system, such as a valve or lock. As such, the actuators 226 may include an electric actuator 240 (e.g., a device that is powered by a motor that converts electrical energy into mechanical torque), pneumatic actuator 242 (e.g., a device configured to convert energy formed by vacuum or compressed air into a linear or rotary motion), a hydraulic actuator 244 (e.g., a cylinder or fluid motor that uses hydraulic power to facilitate mechanical operation), and/or other actuators 246. Additionally or alternatively, the edge device 130 may include one or more peripheral devices 228.

Such peripheral devices may include any type of peripheral device commonly found in a compute device such as a display or other output device and/or one more input devices, such as a touchscreen or buttons, forming a human-machine interface (HMI). The edge devices 132, 134, 136, 140, 142, 144, and 146 may have components similar to those described in FIG. 2. The description of those components of the edge device 130 is equally applicable to the description of components of the edge devices 132, 134, 136, 140, 142, 144, and 146 and is not repeated herein for clarity of the description.

Figure 3:
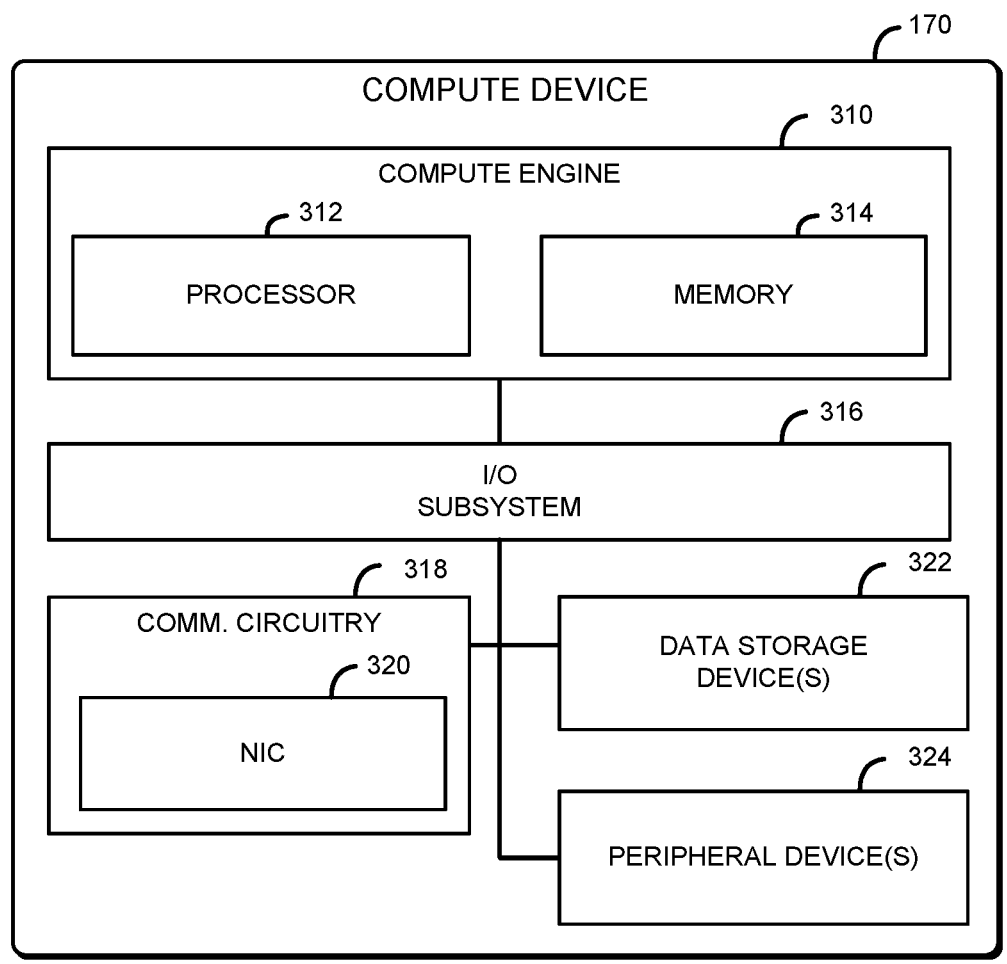
FIG. 3 is a simplified block diagram of a compute device of the system of FIG. 1.

Referring now to FIG. 3, each compute device 170 may be embodied as any type of device (e.g., a computer) capable of performing the functions described herein, including receiving data indicative of conditions at one or more industrial sites, determining from a model that relates condition data to safety statuses, whether a safety hazard is present at an industrial site, receiving feedback on the determination, adjusting the model as a function of the received feedback, and sending responsive data to one or more edge devices to perform an action to mitigate the safety hazard. As shown in FIG. 3, the illustrative compute device 170 includes a compute engine 310, an input/output (I/O) subsystem 316, communication circuitry 318, one or more data storage devices 322, and peripheral devices 324. Additionally, in some embodiments, one or more of the illustrative components may be incorporated in, or otherwise form a portion of, another component.

The compute engine 310 may be embodied as any type of device or collection of devices capable of performing various compute functions described below and is similar to the compute engine 210 with reference to FIG. 2. As such, the compute engine 310 may be embodied as a single device such as an integrated circuit, an embedded system, a field-programmable gate array (FPGA), a system-on-a-chip (SOC), or other integrated system or device. Additionally, in some embodiments, the compute engine 310 includes or is embodied as a processor 312 and a memory 314, similar to the processor 212 and memory 214 described with reference to FIG. 2. The compute engine 310 is communicatively coupled to other components of the compute device 170 via the I/O subsystem 316, which is similar to the I/O subsystem 216 described with reference to FIG. 2.

The communication circuitry 318 may be embodied as any communication circuit, device, or collection thereof, capable of enabling communications between the compute device 170 and another device (e.g., other compute devices 170, the edge devices 130, 132, 134, 136, 140, 142, 144, 146, etc.). The communication circuitry 318 may be configured to use any one or more communication technology (e.g., wired or wireless communications) and associated protocols (e.g., Ethernet, Bluetooth®, Wi-Fi®, WiMAX, etc.) to effect such communication. The illustrative communication circuitry 318 includes a network interface controller (NIC) 320, similar to the NIC 220 described above with reference to FIG. 2. Additionally, the one or more illustrative data storage devices 322 are similar to the data storage devices 222 described above with reference to FIG. 2 and the peripheral devices 324 are similar to the peripheral devices 228 described above with reference to FIG. 2. It should be appreciated that the edge devices 130, 132, 134, 136, 140, 142, 144, 146 and the compute devices 170 may include other components, sub-components, and devices commonly found in a computing device, which are not discussed above in reference to the edge device 130 and compute device 170 and not discussed herein for clarity of the description.

In the illustrative embodiment, the edge devices 130, 132, 134, 136, 140, 142, 144, 146 and the compute devices 170 are illustratively in communication via a network 160, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 4:
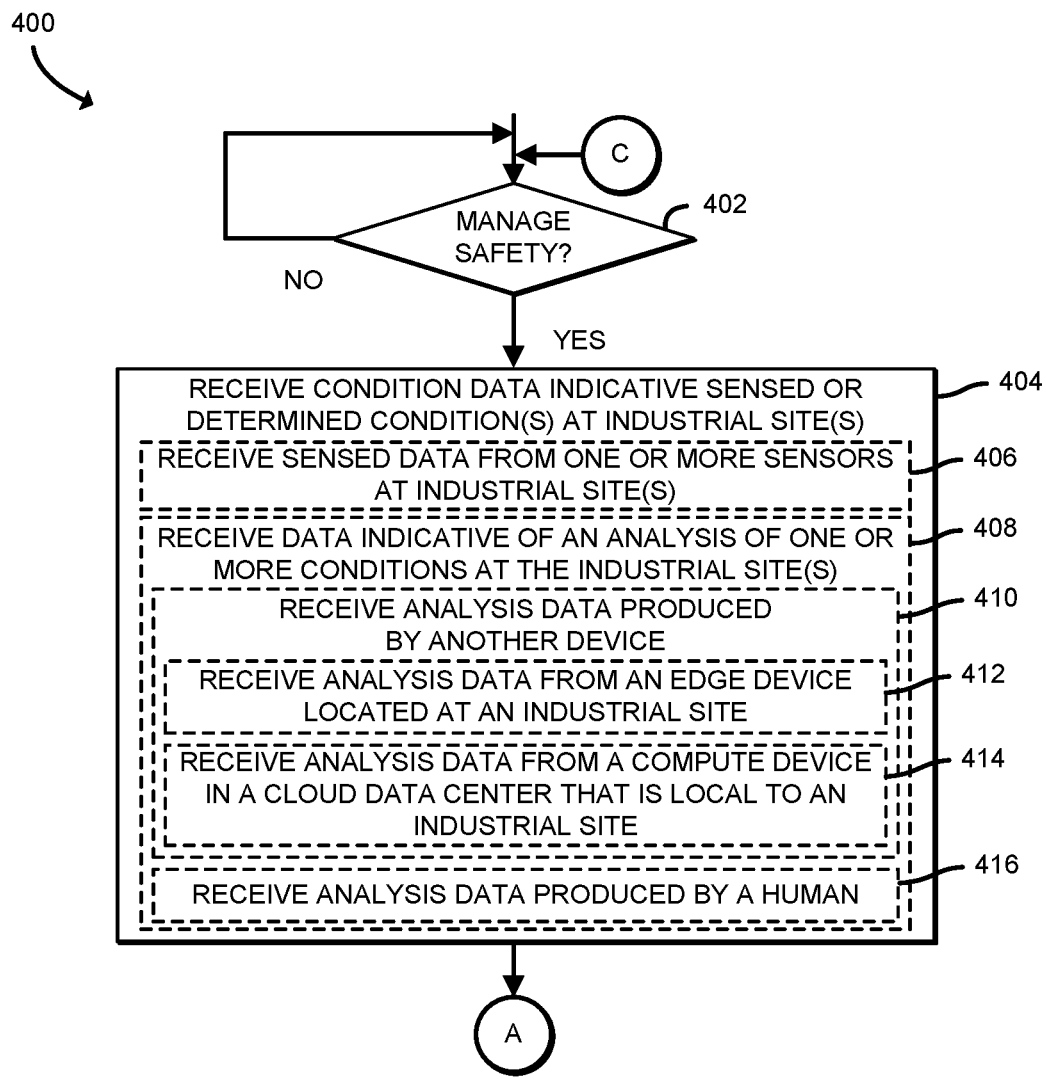
FIGS. 4-6 are a simplified flow diagram of at least one embodiment of a method for managing safety at one or more industrial sites that may be performed by a compute device of FIGS. 1 and 3.

Referring now to FIG. 4, a compute device 170 (e.g., in a cloud data center 110, 120, 122) may perform a method 400 for managing safety at one or more industrial sites 180, 182. In the illustrative embodiment, the method 400 begins with block 402 in which the compute device 170 determines whether to perform safety management. In the illustrative embodiment, the compute device 170 may determine to perform safety management in response to a request from a user to do so, upon determining that a configuration setting has been set to a value indicative of an instruction to perform safety management, upon determining that the compute device 170 is communicatively coupled to the network 160, and/or based on other factors. Regardless, in response to a determination to perform safety management, the method 400 advances to block 404, in which the compute device 170 receives condition data indicative of sensed or determined conditions at one or more industrial sites (e.g., the industrial site 180). In doing so, and as indicated in block 406, the compute device 170 may receive sensed data from one or more sensors (e.g., the sensors 230) at an industrial site 180, 182. For example, the compute device 170 may receive an image of one or more components (e.g., wires, pipes, etc.), an audio sample (e.g., a sound of a particular component in a machine during operation), and/or a temperature measurement. As indicated in block 408, the compute device 170 may receive data indicative of an analysis of one or more conditions at the industrial site 180, 182. In doing so, and as indicated in block 410, the compute device 170 may receive analysis data from another device in the system 100. For example, and as indicated in block 412, the compute device 170 may receive analysis data from an edge device (e.g., the edge device 130) located at an industrial site (e.g., the industrial site 180). That is, while the compute device 170 may utilize a model to analyze condition data as described in more detail herein, an edge device 130, with relatively constrained compute capacity, may still perform an analysis of sensor data, such by performing a mathematical transformation of the sensed data, performing preprocessing such as object recognition and tagging, frequency analysis, or other preprocessing operations, and/or make an initial determination as to whether a particular condition or set of conditions represents a safety hazard. The compute device 170 may also receive analysis data produced by another compute device 170, as indicated in block 414. For example, the compute device 170 may be located in the remote cloud data center 110 and receive analysis data from a compute device 170 in a local data center 120, 122. Additionally or alternatively, the compute device 170 may receive analysis data produced by a human (e.g., an analysis entered by a human into an edge device 136 located at an industrial site 180, such as during a safety observation tour of the industrial site 180), as indicated in block 416. Subsequently, the method 400 advances to block 418 of FIG. 5, in which the compute device 170 analyzes the received condition data with a model that associates condition data with safety status data to determine a safety status of each industrial site 180, 182.

Figure 5:
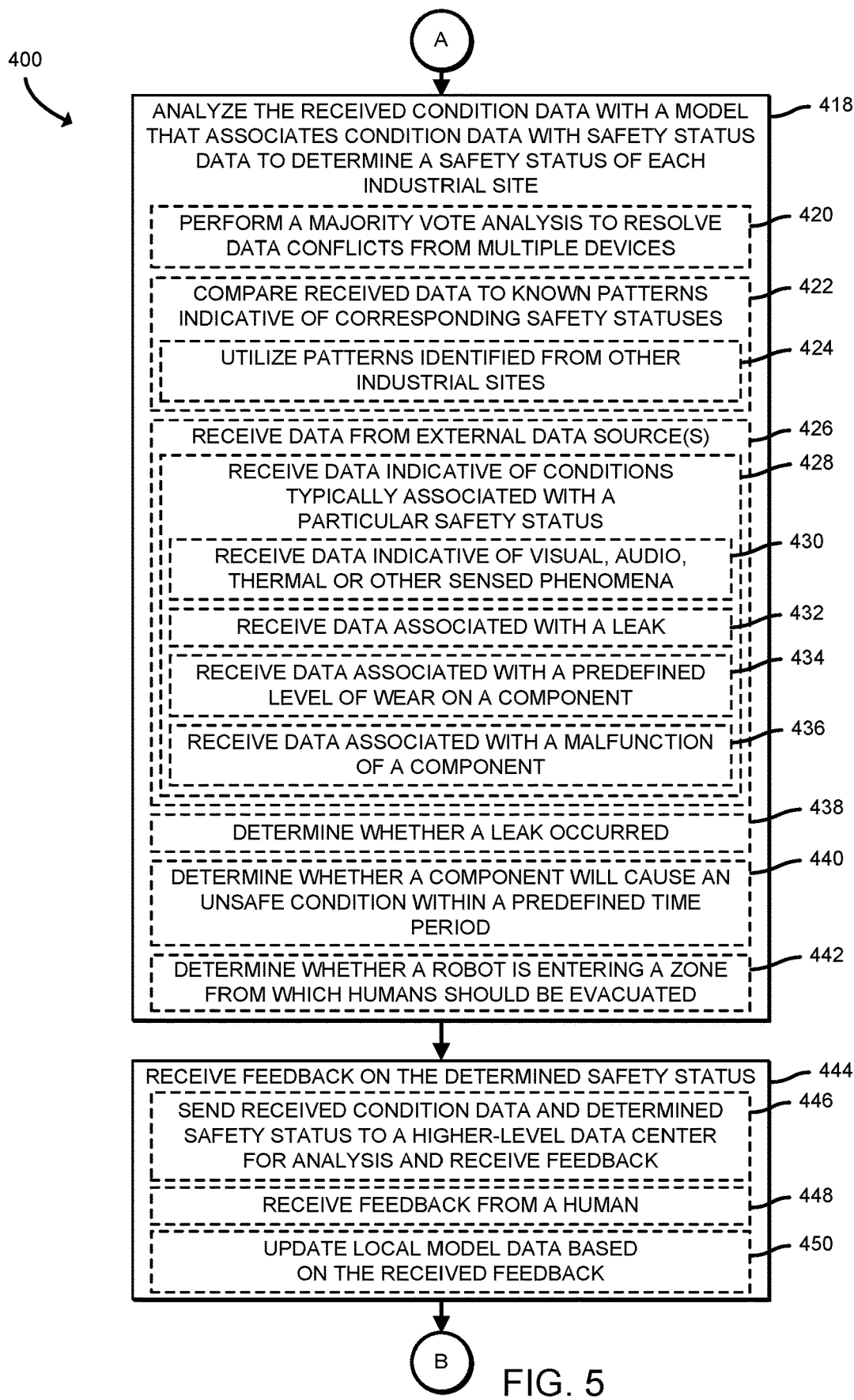

Referring now to FIG. 5, in analyzing the received condition data, the compute device 170 may perform a majority vote analysis to resolve conflicts in data received from multiple devices (e.g., ignoring data from one edge device 130 that conflicts with data received from multiple other edge devices 132, 134), as indicated in block 420. As indicated in block 422, the compute device 170, in the illustrative embodiment, compares the received data to known patterns indicative of corresponding safety statuses. In doing so, the compute device 170 may compare the received data to patterns identified in condition data from other industrial sites (e.g., the industrial site 182) as being related to a particular safety hazard (e.g., early stages of wire chafing that could lead to an electrical system safety hazard, a mating of two metals on a pipe that will lead to corrosion and leaking of the pipe, a characteristic sound of a motor that is failing in a safety system, etc.), as indicated in block 424. As indicated in block 426, the compute device 170 may also receive data (e.g., to be incorporated into the model utilized to determine a safety status associated with the received condition data) from one or more external data sources, such as an external database. For example, and as indicated in block 428, the compute device 170 may receive data indicative of conditions that are typically associated with a particular safety status. In doing so, and as indicated in block 430, the compute device 170 may receive data that associates visual, audio, thermal, or other types of phenomena (e.g., condition data) with a particular safety hazard. As indicated in block 432, the compute device 170 may receive data that associates a set of phenomena (e.g., condition data) with a leak (e.g. an appearance or sound of a leaking pipe). Additionally or alternatively, the compute device 170 may receive data that associates a set of condition data with a predefined level of wear on a component, as indicated in block 434. Similarly, the compute device 170 may receive data that associates a set of condition data with a malfunction of a component, as indicated in block 436. In analyzing the received condition data, the compute device 170 may determine whether a leak has occurred, as indicated in block 438. Additionally or alternatively, the compute device 170 may determine whether a component will cause an unsafe condition within a predefined time period, as indicated in block 440. In some embodiments, and as indicated in block 442, the compute device 170 may determine, from visual or other data produced by sensors of a particular edge device 130 (e.g., a robot), whether the edge device 130 is entering a zone (e.g., the safety zone 152) from which humans should be evacuated (e.g., to enable the edge device 130 to safely perform an operation without endangering a human in the vicinity).

Subsequently, as indicated in block 444, the compute device 170 may receive feedback on the safety status determined in block 418. For example, the compute device 170 may send the received condition data (e.g., from block 404) and the determined safety status (e.g., that a leak has occurred) to a higher-level data center (e.g., from the data center 120 to the remote data center 110) for analysis, and subsequently receive feedback from the higher-level data center (e.g., that the condition data is actually indicative of a different safety hazard, that a leak is not present, etc.), as indicated in block 446. Additionally or alternatively, the compute device 170 may receive feedback on the determined safety status from a human (e.g., an expert assigned to review determinations made by the compute device 170), as indicated in block 448. As indicated in block 450, the compute device 170 may update the model based on the received feedback (e.g., adjust weights in a neural network, etc.). For example, the compute device 170 may update the model to produce, from the received condition data, a determination represented in the received feedback rather than the original determination made by the compute device 170. Subsequently, the method 400 advances to block 452 of FIG. 6, in which the compute device 170 determines whether a responsive action should be performed, based on the determination of the safety status.

Figure 6:
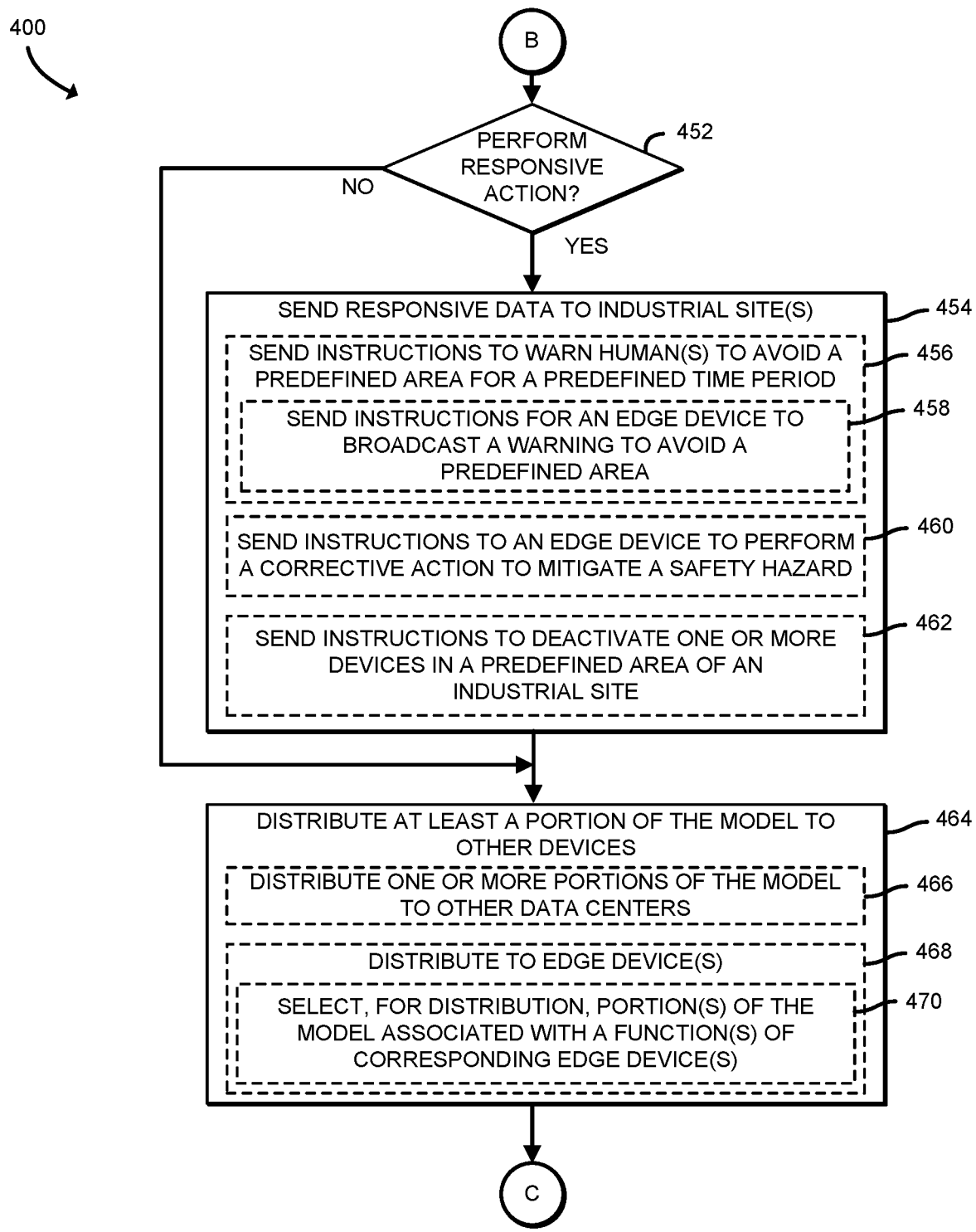

Referring now to FIG. 6, the compute device 170 may determine that a responsive action should be performed if the safety status indicates that a safety hazard is present or is developing. In response to a determination that a responsive action should be performed, the method 400 advances to block 454, in which the compute device 170 sends responsive data to the industrial site associated with the safety hazard (e.g., the industrial site 180). In doing so, and as indicated in block 456, the compute device 170 may send instructions to warn one or more humans to avoid a predefined area (e.g., the safety zone 152) for a predefined time period (e.g., a specified number of hours, a specified number of days, etc.). For example, and as indicated in block 458, the compute device 170 may send instructions for an edge device 130 to broadcast a warning to avoid the predefined area. In some embodiments, the compute device 170 may send instructions to an edge device 130 to perform a corrective action to mitigate a safety hazard (e.g., to terminate a flow of liquid to a leaking pipe, to seal the leak, etc.), as indicated in block 460. As indicated in block 462, the compute device 170 may send instructions to deactivate one or more devices in a predefined area (e.g., the safety zone 152) of the industrial site 180.

Subsequently, or if the compute device 170 determined in block 452, that a responsive action should not be performed, the compute device 170 may distribute at least a portion of the model to other devices in the system 100, as indicated in block 464. For example, and as indicated in block 466, the compute device 170 may distribute one or more portions of the model to another data center (e.g., send the portion of the model that was updated as a result of the feedback in block 450 to the data center 122 or the data center 110). Additionally or alternatively, the compute device 170 may distribute the portion of the model to one or more edge devices 130, 132, 134, 136, 140, 142, 144, 146 (e.g., to enable those edge devices to correctly identify similar safety hazards in the future), as indicated in block 468. Additionally, in doing so, the compute device 170 may select, for distribution, a portion of the model associated with a function of the corresponding edge device 130 that is to receive that portion of the model, as indicated in block 470. For example if an edge device 130 includes a camera and the compute device 170 determined that a leak is present based on visual information (e.g., an image or video) provided by the edge device 130, the compute device 170 may send, to the edge device 130, the portion of the model that was utilized to identify the condition as leak. Subsequently, the method 400 loops back to block 402 of FIG. 4 to determine whether to continue to perform safety management.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

The invention claimed is:

1. A method for managing safety at an industrial site, the method comprising:
   receiving, by a compute device in a cloud data center, condition data indicative of a sensed or determined condition at the industrial site, wherein the condition data was produced at least in part by an edge device at the industrial site;
   analyzing, by the compute device and with a model that associates conditions with corresponding safety statuses, the received condition data to determine a corresponding safety status associated with the industrial site;
   determining, by the compute device and as a function of the determined safety status, whether a responsive action is to be performed at the industrial site;
   sending, by the compute device, to the edge device at the industrial site and in response to a determination that a responsive action is to be performed at the industrial site, responsive data indicative of the responsive action to be performed;
   receiving, by the compute device and from a human or another cloud data center, feedback on the determined safety status; and
   updating, by the compute device, the model as a function of the received feedback.

2. The method of claim 1, further comprising sending, by the compute device, at least a portion of the model to the edge device at the industrial site.

3. The method of claim 1, wherein analyzing the received condition data comprises performing a majority vote analysis to resolve conflicts in condition data received from multiple edge devices.

4. A compute device for a cloud data center, the compute device comprising:
   a compute engine configured to:
      receive condition data indicative of a sensed or determined condition at an industrial site, wherein the condition data was produced at least in part by an edge device at the industrial site;
      analyze, with a model that associates conditions with corresponding safety statuses, the received condition data to determine a corresponding safety status associated with the industrial site;
      determine, as a function of the determined safety status, whether a responsive action is to be performed at the industrial site;
      send, to the edge device at the industrial site and in response to a determination that a responsive action is to be performed at the industrial site, responsive data indicative of the responsive action to be performed;
      receive, from a human or another cloud data center, feedback on the determined safety status; and
      update the model as a function of the received feedback.

5. The compute device of claim 4, wherein the compute engine is further configured to send at least a portion of the model to the edge device at the industrial site.

6. The compute device of claim 4, wherein to analyze the received condition data comprises to perform a majority vote analysis to resolve conflicts in condition data received from multiple edge devices.

7. The compute device of claim 4, wherein to analyze the received condition data comprises to compare the received condition data to a set of patterns indicative of corresponding safety statuses.

8. The compute device of claim 7, wherein to compare the received condition data to a set of patterns comprises to compare the received condition data to a set of previously-identified patterns of condition data obtained from multiple industrial sites.

9. The compute device of claim 4, wherein to analyze the received condition data comprises to determine whether a leak has occurred.

10. The compute device of claim 4, wherein to analyze the received condition data comprises to determine whether a component at the industrial site will cause an unsafe condition within a predefined time period.

11. The compute device of claim 4, wherein to send responsive data comprises to send instructions to the edge device to broadcast a warning to avoid a predefined area at the industrial site.

12. The compute device of claim 4, wherein to send responsive data comprises to send instructions to the edge device to perform a corrective action to mitigate a safety hazard.

13. The compute device of claim 4, wherein to send responsive data comprises to send instructions to deactivate one or more devices in a predefined area of the industrial site.

14. One or more non-transitory machine-readable storage media comprising a plurality of instructions stored thereon that, in response to being executed, cause a compute device to:

receive condition data indicative of a sensed or determined condition at an industrial site, wherein the condition data was produced at least in part by an edge device at the industrial site;

analyze, with a model that associates conditions with corresponding safety statuses, the received condition data to determine a corresponding safety status associated with the industrial site;

determine, as a function of the determined safety status, whether a responsive action is to be performed at the industrial site;

send, to the edge device at the industrial site and in response to a determination that a responsive action is to be performed at the industrial site, responsive data indicative of the responsive action to be performed;

receive, from a human or a cloud data center, feedback on the determined safety status; and update the model as a function of the received feedback.

15. The method of claim 1, further comprising receiving data indicative of a leak.

16. The method of claim 1, further comprising receiving data indicative of a predefined level of wear on a component.

17. The method of claim 1, further comprising receiving data indicative of a malfunction of a component.

18. The method of claim 1, wherein analyzing the received condition data comprises determining whether a component at the industrial site will cause an unsafe condition within a predefined time period.

19. The method of claim 1, further comprising distributing, by the compute device, at least a portion of the model to one or more other devices.

20. The method of claim 1, wherein analyzing the received condition data comprises determining whether a robot is entering a zone of the industrial site.

* * * * *